Jan. 3, 1956     R. A. EKSTROM, JR     2,729,301
CUPOLA WASTE GAS HEAT EXCHANGE AND PURIFYING SYSTEM
Filed March 19, 1953
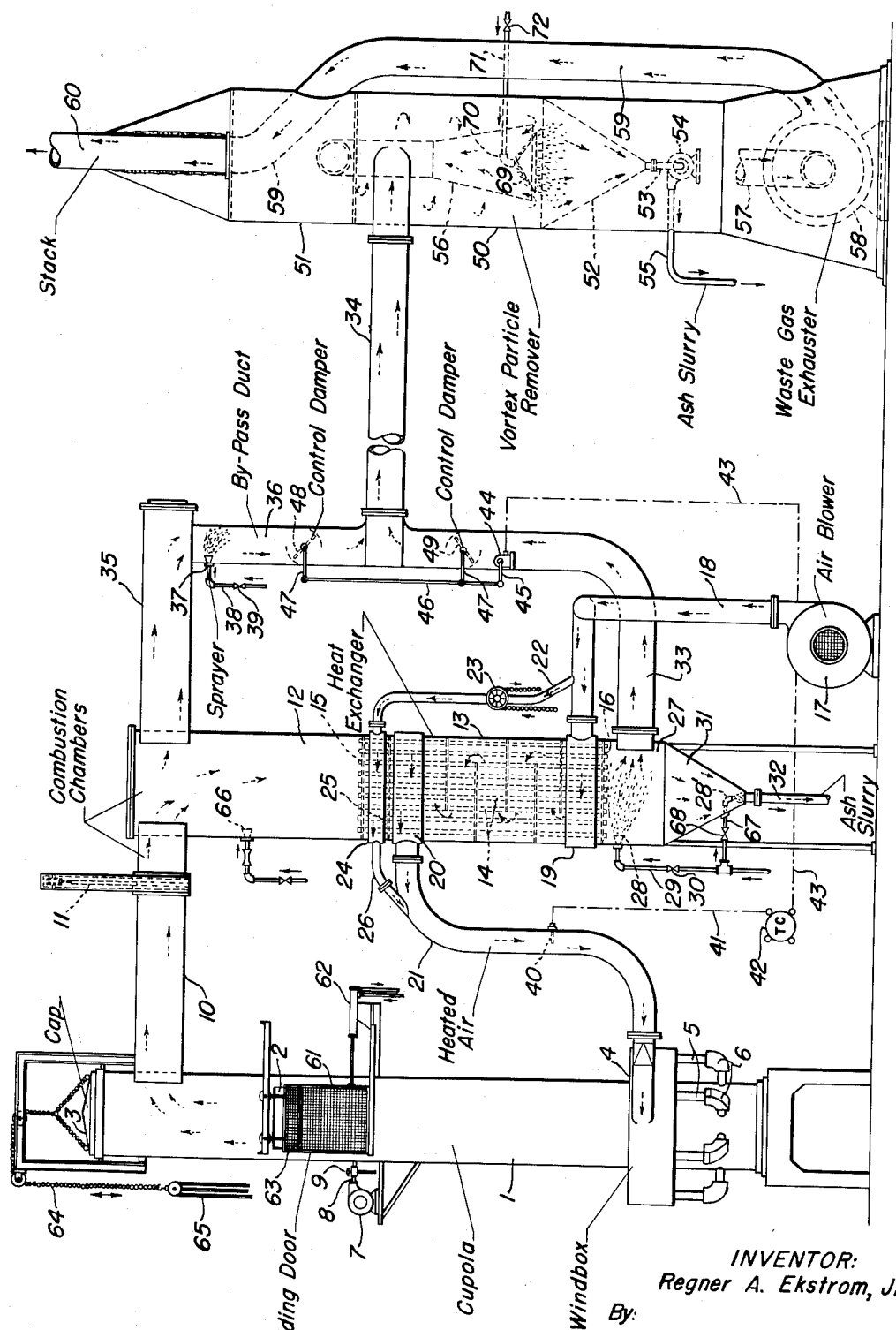
INVENTOR:
Regner A. Ekstrom, Jr.
By: Philip J. Liggett
ATTORNEY:

United States Patent Office 2,729,301
Patented Jan. 3, 1956

2,729,301
CUPOLA WASTE GAS HEAT EXCHANGE AND PURIFYING SYSTEM

Regner A. Ekstrom, Jr., Markham, Ill., assignor to Grindle Corporation, Markham, Ill., a corporation of Illinois Application March 19, 1953, Serial No. 343,301

3 Claims. (Cl. 183—6)

This application is a continuation, in part, of my copending patent application Serial No. 212,625, filed February 24, 1951, now Patent No. 2,667,941 granted February 2, 1954.

The present application is directed to an improved method for handling the inlet and discharge gases for a melting furnace or cupola and more specifically, to a processing arrangement integrating air preheating and stack gas cooling and purification, in a manner providing an improved combination of steps.

In general, presently used types of vertical furnaces and cupolas have been of the open top construction and the waste combustion gases or stack gases have been allowed to discharge to the atmosphere with little or no purification. The escape of smoke, fumes, and silica dust, or other particles from such units, may be injurious or obnoxious to the surrounding territory and its inhabitants. Furthermore, present-day laws or health codes, being enacted in many localities, are banning putrification of the atmosphere with excessive quantities of gases and dust, such as fly-ash and the like, and it is necessary, therefore, to effect improved gas cleaning operations such as provided advantageously by the present invention. The removal of fly-ash has been effected to some degree, in connection with cupolas, but very little has been done to provide a really efficient purification and particle removal system.

Various types of apparatus and flows have been devised for effecting heat exchange between charge streams and discharge streams, so as to provide preheating and cooling of the respective streams. However, only to a limited extent have heat exchange operations been taught and utilized in connection with melting cupolas and, in general, such operations have not been combined at all with fly ash removal or other stack gas cleaning steps.

It is a principal object and feature of the present invention to integrate cupola air charge stream preheating with improved stack gas cooling and purification steps so that there is a resulting highly efficient gas handling system for all of the waste gases of the cupola.

It is a further object of the invention to provide means for oxidizing a large portion of the combustible contaminating material within the waste gas stream in combination with multiple stage steps for removing entrained solid particles from such waste gas streams.

It is a still further object of the invention to provide for passing a controlled portion of the waste gas stream for the cupola in order to preheat the latter; with a preferred embodiment utilizing automatic control means operating responsive to the temperature of the air stream, to regulate the quantity of hot gas flow through the heat exchange zone.

Briefly, the present invention provides an improved cupola gas system, integrating steps of waste gas purification and cooling and air preheating in a manner which comprises maintaining a closed top cupola and burning zone, introducing a controlled quantity of oxygen into admixture with the resulting combustion gases and entrained solids in the upper portion of the cupola and oxidizing incompletely burned material, passing at least a portion of the resulting high temperature gas discharge through a tubular heat exchange zone, passing an air stream in indirect heat exchange with the high temperature gas stream and cooling the latter while heating the air stream to a predetermined temperature, passing the resulting heated air stream to the air inlet portion of the cupola, spraying and quenching the hot gas discharge stream passing from the lower end of the tubular heat exchange zone and removing at least a portion of the solids material from the stream passing the cooled and partially cleaned stream from the aforesaid spraying zone and subjecting it to a second stage of particle removal to effect the withdrawal of at least a portion of the remaining entrained and more finely divided particles, and discharging a substantially cooled and cleaned waste gas stream from the system.

A controlled quantity of air or other oxygen containing stream is preferably introduced into the upper portion of the cupola so that carbon monoxide in the waste gas stream may be oxidized to carbon dioxide, whereby to provide additional heat and to remove the harmful carbon monoxide content in the stack gas. Preferably, an elongated combustion chamber or enclosed zone adjacent to and connecting with the upper portion of the cupola is provided to insure that there is obtained a substantially complete oxidation of the carbon monoxide. Also, at least a portion of the coke and other combustible solid material which is entrained with the gas stream may be oxidized. A desirable arrangement of the gas system of this invention provides a movable charging door which partially closes the charge bucket opening to the cupola zone in order that a minimum of unnecessary air enters the upper portion of the cupola to in turn increase the volume of gases which must be handled through the gas cleaning and purifying system. The introduction of a controlled portion of air into the combustion zone of this system permits reductions of CO content from the order of 5 to 10% to about 1% or less, of the total waste gases, as well as permit obtaining a high efficiency in the subsequent utilization of all available heat so that there is a resulting saving in the use of coke, silicon and manganese in the cupola while effecting increased capacities from the cupola.

The waste gas stream passing from the cupola and adjacent combustion zone to the heat exchange zone is preferably directed in a descending flow through the heat exchange zone itself so that the waste gas stream, upon being discharged from the heat exchanger, may be subjected to a water spray in an adjacent spraying zone for further cooling and a first stage of solid particle removal. In other words, entrained particles leaving the heat exchange zone may be sprayed with a water stream to provide for aid in the collection and gravity fall of particles to a lower collection hopper and, in some cases, to form a slurry which can be passed in a downward fluid flow to suitable removal means. The air stream, which is charged to the windbox of the cupola, is passed in indirect heat exchange relationship with the hot gas stream in the heat exchange zone in order to effect the desired heating of the charge air, as well as to reduce the temperature of the waste gas stream passing to the outlet stack.

A cupola should be operated at a substantially constant controlled temperature so that melting is effected at optimum conditions. The amount of coke or coal charged to the cupola of course governs, to a large degree, the temperatures therein; however, the quantity of air and the extent of air preheating also have a critical effect on the temperature obtained in the cupola. In other words, the amount of coke charged must be integrated with the air preheat temperature, or vice-versa, so that a constant controlled temperature is maintained in the melting zone. In general, the more preheating which can be obtained, the less are the coke or fuel requirements and there is a resulting improved overall efficiency. It is, however, frequently desirable to substantially standardize charging operations so that, as a result, it is necessary to obtain a relatively unvarying preheat temperature to the air charge stream.

It is to be noted that it is a special feature of the present invention, to measure the temperature of the preheated air stream and to regulate the flow of the hot gas stream to the heat exchange zone and to a by-pass zone responsive to variations in the temperature of the preheated air stream. A by-pass duct is provided from the cupola and combustion zone of the unit in order to pass a portion of the waste gas stream directly to a separate spraying and particle removal zone and to the stack. As will be described more fully hereinafter, automatic control means is provided to regulate the volume of flow through the by-pass duct and through the heat exchange zone.

Additional stages of particle removal are provided subsequent to the heat exchange and initial spraying zone, that particles passing through the by-pass duct and fines leaving the spraying zone adjacent the heat exchanger may be removed before the final discharge of the gases to the atmosphere. Such secondary removal means may comprise a cyclone or vortex type of particle remover; or, may comprise various filtering means. Where bag filters, or glass filters, etc. are utilized in the secondary stages of particle removal system of the present invention, then the temperature of the waste gas stream must be lowered to at least a temperature of the order of about 600° F.

Reference to the accompanying drawing and the following description thereof will serve to further clarify the improved operation and advantageous features of the integrated gas system of the present invention.

Referring now to the drawing; there is shown a vertical cupola 1, such as is utilized in the foundry industry for melting iron. This cupola is provided with a charging opening 2 which is in turn preferably constructed in a manner having a movable and adjustable door arrangement which will permit a controlled amount of air to enter the cupola during the operating period and will open wide when the charging bucket is releasing material to the inside of the cupola. The embodiment shown provides a sliding screen door 61 which may be operated by a pneumatic opening and closing means 62. The screening in door 61 may be washed with a clay slurry which is effective to protect the metal screen as well as partially block the mesh openings and reduce the amount of air intake. The upper part of the door 61 may also have a vertically adjustable section 63 which will vary the size of the door over the cupola opening 2 and further control the oxygen intake to the upper portion of the cupola. In accordance with the present invention, a removable cap or closure member 3 is provided at the top of the cupola in order that the entire waste gas stream is passed from the upper portion of the cupola through the gas cooling and cleaning system of this invention. A desirable construction and arrangement and the top end of the closed type of cupola provides means for raising and lowering the cap 3 by a chain 64 and pulley means 65. Counterweight means connecting with the pulley or block and tackle means 65 can also be provided to substantially balance the cap 3 and permit it to raise with slight upward pressures whereby the latter can serve as an explosion or pressure relief door for the cupola.

A suitable windbox 4 and a plurality of downpipes 5 with tuyere elbows 6 extend from the latter into the lower air inlet or tuyere zone at the lower portion of the cupola. A small blower 7 connecting with the upper portion of the cupola through line 8 and control valve 9 provides means for introducing a controlled quantity of air and fuel into the upper portion of the cupola and to a gas combustion zone. Although not shown in the drawing, suitable lighter or ignition devices may also connect with and project into the upper portion of the cupola in order to insure the constant ignition of carbon monoxide and other combustion material being discharged from the lower melting portion of the cupola zone. It may also be noted that auxiliary air may be supplied to the upper part of the cupola by means of a modified blower 7 rather than through the adjustable door arrangement described hereinbefore.

Extending laterally from the upper portion of the cupola 1 is a lined and insulated combustion chamber 10 which provides an elongated zone permitting the substantially complete oxidization of the combustible material within the waste gas stream. The oxygen introduced by way of the adjustable door 61, or by means of an auxiliary air blower should, of course, be sufficient to provide for the oxidization of carbon monoxide and at least a portion of coke particles which may be entrained with the waste gas stream. A close-off gate 11 is indicated in conjunction with the combustion chamber 10 and may be utilized to close off the heat exchange and air purification system from the cupola 1, or alternatively, the gate 11 may serve as a cupola selector gate where more than one cupola is connected with a single heat exchange and gas purification system. The combustion duct 10, in the present embodiment connects with the upper portion of a vertical chamber 12, which may serve as an additional combustion chamber as well as an inlet zone to a vertically disposed heat exchanger 13. One or more auxiliary burners 66 may communicate with the interior of chamber 12 so that a desired temperature may be imparted to the exchanger 13 when the waste gas stream is too low in B. t. u. value. As set forth, it is necessary to maintain a closely controlled air preheat for good operation in the cupola. The burners 66 may be any conventional type of oil or gas-fired device. The heat exchanger is indicated diagrammatically as having a plurality of tubular members 14 extending between an upper tube sheet 15 and a lower tube sheet 16 such that the hot waste gas stream passes downwardly through the tubes 14 of the heat exchanger.

The air stream which passes to the windbox 4 at the lower end of the cupola 1 is passed by way of an air blower 17 through conduit 18 to the waste gas outlet end of the heat exchanger 13 so that the air may pass countercurrently in an indirect heat exchange with the hot gas stream therein. The present embodiment indicates the air stream as being distributed from a lower header 19 and being baffled upwardly through the heat exchanger 13 and around the hot gas tubes 14 to an upper header or collecting zone 20. The latter distributes a hot air stream by way of duct or conduit 21 to the windbox 4. A preferred heat exchange flow also passes a controlled relatively small portion of the air stream from line 18 through line 22 and valve 23 into a small upper air distributing and discharging zone 24. The latter zone is separated from the lower portion of the heat exchanger 13 by means of a partition or tube sheet 25 and provides a construction which permits a controlled portion of heated air to pass in heat exchange with the high temperature inlet ends of the hot gas tubes 14. A line 26 connects the zone 24 directly with conduit 21 such that this small controlled portion of preheated air may combine with the heated air in the latter duct and pass to the windbox 4.

The cooled waste gas stream, being discharged from the lower ends of the tubes 14, passes into a spraying zone 27 which provides for the introduction of a water spray from one or more nozzles 28 connecting with line 29 having control valve 30, whereby the gas stream may be further cooled and entrained solid particles may be wetted and collected in a lower conically shaped collecting zone 31. If desired, sufficient water may be introduced into the spray zone 27 and collecting zone 31 to insure maintaining wetted walls and to provide for slurrying the collected particles from the lower end of zone 31. A second spray nozzle 28 from line 67 and control valve 68 may be used to introduce additional water into the hopper 31 and to form a slurry of the particles. A line 32 provides for passing a slurry stream of the removed particles to a slag tank or other suitable removable means. If dry particles are to be discharged, they can be allowed to fall through a suitable outlet door means into a collecting bin and, subsequently, carted away.

The resulting partially cooled and sprayed waste gas stream, with a substantial portion of the solid particles removed therefrom, is passed from the spray zone 27 by way of an outlet duct 33 to a combined waste gas duct 34. In the latter, a by-passed portion of the cupola waste gas stream is allowed to admix with or combine with the cooled portion of the gases prior to being discharged from the system. In accordance with a particular feature of the present invention to permit close control in effecting the preheating of the cupola air stream, provision is made for passing a portion of the waste gas stream from the combustion zones 10 and 12 through by-pass ducts 35 and 36, the latter connecting with the combined waste gas duct 34. Thus, the extent of heat exchange effected within exchanger 13 may be controlled by the quantity of hot gas passing through tubes 14 and into indirect heat exchange with the air stream being introduced into the lower end of the cupola. In the present embodiment, an independently positioned sprayer 37, being supplied by line 38 and having control valve 39, discharges a water spray into the upper portion of by-pass duct 36 so that the temperature of gas streams may be reduced and so that entrained solid particles, passing through the by-pass ducts, may be coagulated and substantially removed from the system. The sprayed solid particles are either washed down the sides of ducts 36 and 33 in order to eventually combine with the sprayed particles of zones 27 and 31, being passed from the latter in a slurry stream through outlet line 32; or, alternatively, allowed to settle in a fairly dry state where the particles are to be handled as dry material. The sprayer 37 also provides for effecting substantial cooling of the portion of the hot gas stream which passes by way of the by-pass ducts.

It is a still further feature of the present gas handling system to provide for automatic control means which regulates the quantity of air passing by way of the heat exchange zone. One embodiment of the automatic control means comprises a thermocouple or other temperature sensitive means 40 in the air duct 21 so as to obtain a temperature reading for the preheated air stream being introduced into the windbox 4 and cupola 1. The indicator 40 connects through line 41 to a suitable temperature controller 42 which, in turn, connects through line 43 with a power-operated valve control means 44. The temperature control 42 may comprise any standard form of electrical or air operated apparatus suitable for effecting regulation by a varying indication from 40. The damper controller 44 operates through a movable arm 45, rod 46 and damper arms 47 to effect movement of separate control dampers 48 and 49. A movable pivoted type of damper 48 is shown positioned within the by-pass duct 36 while a similar type of movable and pivoted control damper 49 is positioned within the duct 33 and these separate dampers are positioned to oppose one another in their action. In other words, damper 48 connects through arm 47 with the control rods and controller 44 in a manner to open while control damper 49 closes; or, alternatively, damper 48 moves to close off duct 36 when control damper 49 is opening in duct 33. In actual operation, the temperature controller 42 effects a movement of the mechanical controller 44 to open damper 48 and close damper 49 when the preheated air stream in duct 21 reaches a predetermined high temperature as indicated by the temperature sensitive means 40. Normally, the air stream to the cupola may be heated to a temperature to the order of 400° F. to 450° F.; however, where the temperature climbs materially above 450° F., or to a temperature which may be damaging to the construction of the windbox and air inlet means to the cupola tuyeres, the control means operates to close the damper 49 and open damper 48 so as to by-pass a greater portion of the waste gas stream through ducts 35 and 36. Increasing the flow to the by-pass ducts decreases the waste gas flow through the heat exchanger 13 and there is a resulting decrease in the extent of heat exchange and preheating of air to the cupola. Conversely, where the temperature measuring means 40 shows that the preheated air stream duct 21 is within the range desired, or lower than that which may be utilized for the air stream to the cupola, then the control damper 49 may be maintained steady, or open, while damper 48 remains steady or closes. When damper 48 closes and damper 49 opens, there is a greater flow of the waste gas stream through heat exchanger 13 and a resulting increase in heat transfer to the air stream passing into duct 21.

Higher preheat temperatures than those mentioned above may, of course, be utilized where the cupola ducts, windbox, etc. are designed to withstand high temperature conditions. It may also be noted that where the heat exchanger 13 provides a relatively high pressure drop, then a fairly close control of gas flow can be obtained with a single automatically controlled damper in duct 36. In other words, by allowing more or less quantities of gas flow through the by-pass duct, then lesser or greater quantities of hot gases are forced through the heat exchange zone 13.

The combined air stream passing through duct 34, which has been partially cooled and has had at least a portion of the solid particles removed, is introduced in accordance with this present invention, into a second stage of particle removing. The present embodiment provides a vortex or cyclone particle removing zone 50. The present embodiment shows the vortex removing zone contained within a lower stack supporting section 51. A conical hopper 52 is arranged to collect and discharge centrifuged particles from the waste gas stream. These particles are passed from the hopper 52 by way of line 53, blower 54 and line 55 to a suitable disposal means, not shown. The substantially cleaned waste gas stream passes upwardly through a center outlet duct 56 within the vortex removing section 50. This embodiment also indicates that the waste gas stream passes from the center duct 56 by way of line 57 to waste gas exhauster fan 58 to, in turn, pass by way of line 59 to an upper stack 60. The latter discharges the cooled and purified waste gases to the atmosphere. The exhauster 58 operates in conjunction with the vortex removing section 50 to increase the efficiency of that type of apparatus in effecting the removal of entrained fine particles. The initial spraying zones 27 and 37 are effective to remove the coarser and heavier particles in the waste gas streams and normally remove from 40% to 60% of the total amount of entrainment material, while the secondary stage of particle removing, as provided by the vortex removing section in the illustrated embodiment, may be effective in removing 20% to 50% of the entrained material, so that at least about 90% of fly-ash and entrained material is removed from the system before the waste gases are discharged to the atmosphere.

It is in the scope of the present invention to provide additional sprayer zones within the gas outlet portion of this system where it is desired to have additional stages of particle removing and/or additional cooling of such gases prior to being passed to the stack. A still further desirable embodiment of the second stage of particle removal may include a water wash of the cleaned gas stream. As indicated, a cone member 69 may distribute a water film or spray to the cleaned gas stream rising upwardly through conduit 56. Water is supplied to the interior of the latter through spray head 70 and line 71 having valve 72.

Also, as noted hereinbefore, varying types of particle removing zones may be incorporaed within either the initial or secondary stages of the gas discharge portion of this system. For example, other types of particle removers may be utilized at the lower end of the stack, such as filters or electrical participating means in lieu of spray and centrifugal types of removers. Various modified types of heat exchangers may be utilized in place of the particular tubular type indicated diagrammatically in the present drawing, although it is a preferred feature of the present invention to effect a down-flow of the waste gas stream from the lower end of the heat exchange zone into a directly adjacent spraying zone so that particles may be wetted by the spray action and deflected downwardly into a collecting zone for removal in a slurry stream. Still other modifications may be made in connection with the mechanical apparatus of the specific embodiment which has been herewith shown and described for effecting a system for waste gas cooling and cleaning integrated with air preheating.

I claim as my invention:

1. Apparatus for simultaneously cooling and purifying discharge gases from a cupola and for pre-heating air charged there to which comprises in combination, a combustion chamber connected with the upper portion of said cupola, an indirect heat exchange section connected with and positioned below said combustion chamber whereby resulting high temperature discharge gases and entrained material may pass in downward flow through said heat exchange section, conduit means introducing air to said heat exchange section and additional conduit means passing resulting heated air from the latter section to said cupola, a spraying zone connected to and in open communication with the discharge end of said heat exchange section, fluid inlet and spraying means within said spraying zone, slurry outlet means from said spraying zone, conduit means connected to said spraying zone for passing resulting cooled and sprayed discharge gases therefrom, the latter conduit means connected with mechanical particle separating means, and additional conduit means connecting said particle separating means with a gas outlet stack.

2. Apparatus for simultaneously cooling and purifying the discharge gases from a cupola and for preheating air being charged thereto, which comprises in combination, a separate confined combustion chamber connected with the upper portion of said cupola and having fuel inlet means connected thereto, a heat exchange section connecting with and positioned below said combustion chamber suitable for receiving the resulting discharge gases and entrained material in a downward flow, a by-pass conduit from said combustion chamber and connected with centrifugal particle separating means, fluid inlet and spraying means connecting with the interior of said by-pass conduit, an air inlet conduit connected with said heat exchange section and a heated air conduit connected between said heat exchange section and said cupola whereby air passing in indirect heat exchange relationship with the hot discharge gases from the cupola may be pre-heated prior to being introduced into the latter, a spraying zone connected with and positioned below the outlet end of said heat exchange section whereby discharge gases leaving the latter pass in a downward direction into the spraying zone, fluid inlet and spraying means connected with the interior of said spraying zone, slurry outlet means from the latter, conduit means for cooled and sprayed discharge gases from said spraying zone connected with said by-pass conduit, flow control means positioned within said by-pass conduit and within the cooled gas discharge conduit, temperature sensitive means in said heated air conduit to said cupola, automatic regulating means connecting said temperature sensitive means to said flow control means in said conduits, whereby to control flow of discharge gases through said heat exchange section, and conduit means connecting said particle separating means with an outlet stack.

3. The apparatus of claim 2 further characterized in that said automatic regulating means connects through a common movable rod and pivoted connecting arms to the separate flow control means in said conduits whereby a single movement of said automatic regulating means effects simultaneous opposing movement of the flow control means, and whereby flow through said separate conduits is regulated automatically responsive to changes in said temperature sensitive means in said heated air conduit.

References Cited in the file of this patent
UNITED STATES PATENTS

| | | |
|---|---|---|
| 1,779,282 | Louis | Oct. 21, 1930 |
| 2,078,747 | Vial | Apr. 27, 1937 |
| 2,142,100 | Avery | Jan. 3, 1939 |
| 2,653,674 | Ortgies | Sept. 29, 1953 |